United States Patent [19]

Blank et al.

[11] 4,135,680

[45] Jan. 23, 1979

[54] FLAT STRIP SPOOL HAVING A CORE PROVIDED WITH STRIP FASTENING MEANS

[75] Inventors: Rudolf Blank, Cologne; Achim Kluczynski, Immekeppel, both of Germany

[73] Assignee: AGFA-Gevaert AG, Leverkusen, Germany

[21] Appl. No.: 816,164

[22] Filed: Jul. 15, 1977

[30] Foreign Application Priority Data

Jul. 21, 1976 [DE] Fed. Rep. of Germany ....... 2632766

[51] Int. Cl.² .............................................. B65H 75/28
[52] U.S. Cl. ........................................................ 242/74

[58] Field of Search ......................... 242/74, 74.1, 74.2, 242/68.5, 118.4

[56] References Cited

U.S. PATENT DOCUMENTS

| | | | |
|---|---|---|---|
| 3,499,202 | 3/1970 | Napor | 242/74 X |
| 3,645,473 | 2/1972 | Kitch | 242/74 X |
| 3,809,218 | 5/1974 | Furst | 242/74 X |

Primary Examiner—Edward J. McCarthy
Attorney, Agent, or Firm—Connolly and Hutz

[57] ABSTRACT

The invention relates to a spool for a flat strip, in particular a film spool, in which an end of the flat strip provided with notches formed by punching is fixed in recesses of the side walls of an encircling groove in the spool core.

3 Claims, 1 Drawing Figure

U.S. Patent   Jan. 23, 1979   4,135,680
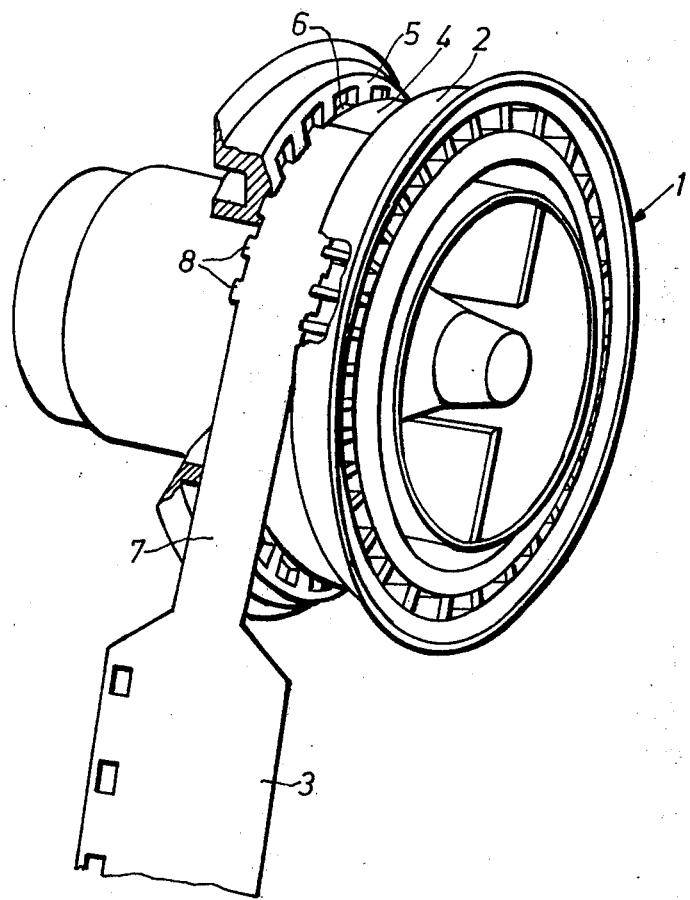

FLAT STRIP SPOOL HAVING A CORE PROVIDED WITH STRIP FASTENING MEANS

This invention relates to a flat strip spool, in particular a film spool, having a core provided with strip fastening means. The spool has a cylindrical core which has a flat, encircling groove located between lateral bearing shoulders in the loop area of the strip.

In a known embodiment the end of the film is rivetted into a groove-shaped recess round the perimeter of a plastics spool core, by means of plastic deformation of individual portions of the side wall of the recess.

This fastening has the drawback that the core is necessarily damaged and thus not re-usable. Besides, the requirements of dimensional tolerance and strength of the core material only allow the use of certain raw materials, since otherwise too many cores would be broken by the rivetting process.

In another known embodiment the end of the strip which is cut into a particular shape is threaded into a locking slit which is tangential to the core perimeter, this slit being provided with a locking notch which prevents the end from becoming unthreaded.

The drawback of this arrangement, apart from the fact that it involves a relatively expensive production process, is that an automatic threading can only be achieved by a complicated procedure which excludes radial pre-orientation of the core.

All of these arrangements aim to provide fixing for the end of the strip such as to ensure that the strip will be securely wound on. However, this fixing proves to be a drawback when the film is unwound, in particular in automatic apparatus, since the film must be stopped and subsequently cut off after running if an undefined tear is not to be risked.

The object of the invention is to provide a simple fastening for a strip on a spool, in particular film spool, which can easily be automated, and which has a high fixing strength in the tangential direction and a low fixing strength in the radial direction.

According to the invention, there is provided a spool for a flat strip comprising a cylindrical core which has a flat, encircling groove in the winding area of the strip between lateral bearing shoulders, wherein recesses are provided in the sides of the groove for receiving fixing teeth on both sides of the end of the strip which locks maximally in the groove width.

By means of convex or concave deformation of the resilient end of the strip transversely to the longitudinal axis of the strip, the fixing teeth can be made to slide without appreciable stress into the recesses of the grooved sides, and are automatically laid on the connecting surfaces between the recesses when the flat strip is wound on the spool.

It is possible to release the end of the flat strip from the core even when the spool is rotating. The radial fixing strength is low compared to the tangential fixing strength, so that damage, in particular the undefined tearing of a film, does not occur when the end of a band is released from the core. A further advantage is that the flat strip spools are not damaged by the secure connection, so that re-use is possible without further ado.

In one embodiment, at least eight recesses which are as large as possible, are distributed along the encircling sides of the groove. After inserting the end of the strip, the actual winding process begins not later than one eight of a revolution of the core by placing the teeth on the webs between the recesses.

In another embodiment there are a large number of recesses in the sides of the groove, of which at least two recesses on each side simultaneously act as fixing devices for the fixing teeth of the end of the band. By using a large number of recesses in the sides of the groove, the end of the film slides into the recesses after not more than a very small rotation independently of the orientation which the spool happens to have, so that the winding process can take place very rapidly. Furthermore, the use of many consecutive recesses make it possible to use an arrangement of widely separated teeth possible, this sometimes being required for a strip for reasons of strength.

An embodiment of the invention is shown in the accompanying drawing and is described in detail below.

An encircling groove 4 having a rectangular cross-section lies between bearing shoulders 2 for a film 3 on the core of a super-8-cassette. The groove 4 has recesses 6 in its sides 5 which receive fixing teeth 8 formed in the film end 7 by a punch.

The recesses 6 can be square or round and variable in number in the sides 5 of the groove. The recesses preferably all extend to the base of groove.

The fixing teeth may be of rectangular, triangular or similar shape, the middle of the end of the film strip being aligned according to the diameter and shape of the groove.

The end of the film 7 is secured on the core, preferably by means of a tool of suitable shape and width for the groove, by the end of the film pressing in the groove 4, the teeth 8, after resiliently deforming engaging in the corresponding recesses 6 in the sides 5 of the groove. Thus the end of the film 7 is adequately secured against the tangential pull of the take-up winding, whilst release by exerting a radial pull is possible, easily and without appreciable resistance, when unwinding is completed.

What we claim is:

1. A rotatable spool for receiving a film strip wound on the spool by rotation having
    a pair of circumferential shoulders separated by an intermediate peripheral groove of a pair of facing side walls formed in said spool normal to a cylindrical plane girdling the spool intermediate said side walls and the adjacent shoulders so that the facing side walls are diametrically positioned and adapted to receive a leader of the film strip
    means for releasably holding the leader of the film strip on the spool in the groove comprising the combination of
    pairs of recesses formed in the facing side walls each pair having a recess in the respective facing side walls diametric to the other respective recess and said pairs being regularly spaced in the groove
    teeth on the leader end of the strip adapted to fit into the pairs of recesses so that the leader end is engagable with the spool and retainable within the groove with a tangential fixing strength which substantially exceeds the radial fixing strength of the leader in the groove whereby the strip is secured to the spool by rotation of the spool to gather the strip on the spool into a wound film and the leader is releasable from the spool when the film is unwound.

2. A spool according to claim 1, wherein at least eight recesses which are as large as possible are equidistantly distributed along the side walls.

3. A spool according to claim 1, wherein there are a large number of recesses in the side walls of which at least two recesses on each side simultaneously act as fixing devices for the said fixing teeth.

* * * * *